(12) United States Patent
Nguyen et al.

(10) Patent No.: US 12,443,987 B1
(45) Date of Patent: *Oct. 14, 2025

(54) SECURE DATA EXCHANGE

(71) Applicant: Wells Fargo Bank, N.A., San Francisco, CA (US)

(72) Inventors: Traci Nguyen, San Francisco, CA (US); Lila Fakhraie, Belmont, CA (US); Anthony Burton, Charlotte, NC (US); Alyce F. Thornton, Discovery Bay, CA (US); Ravi Thota, San Francisco, CA (US); Meghan Butler, Lakeville, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,336

(22) Filed: Apr. 29, 2024

Related U.S. Application Data

(63) Continuation of application No. 18/048,720, filed on Oct. 21, 2022, now Pat. No. 11,995,712, which is a
(Continued)

(51) Int. Cl.
*H04L 9/40* (2022.01)
*G06Q 40/02* (2023.01)

(52) U.S. Cl.
CPC .......... *G06Q 40/02* (2013.01); *H04L 63/083* (2013.01); *H04L 63/0861* (2013.01)

(58) Field of Classification Search
CPC .... G06Q 40/02; H04L 63/0861; H04L 63/083
See application file for complete search history.

(56) References Cited

U.S. PATENT DOCUMENTS

| 7,013,310 B2 | 3/2006 | Messing et al. |
| 7,647,370 B1 | 1/2010 | Liu et al. |
| (Continued) | | |

OTHER PUBLICATIONS

Prosecution History from U.S. Appl. No. 15/337,879, dated Oct. 18, 2018 through Feb. 14, 2020, 114 pp.
(Continued)

*Primary Examiner* — Khoi V Le
(74) *Attorney, Agent, or Firm* — Shumaker & Sieffert, P.A.

(57) ABSTRACT

In an example, a computer-implemented method includes determining a set of permissions that specifies types of account data of one or more financial accounts to share with a third-party, the one or more financial accounts being associated with a user and held by a financial institution, and generating authorization data that authenticates the third-party and authorizes the third-party to access the types of account data specified by the set of permissions. The method also includes transmitting the authorization data to the third-party, receiving a request for authorization that includes the authorization data and a request for account data of the one or more financial accounts that conforms to the types of account data specified by the set of permissions, authorizing the third-party based on the authorization data, and transmitting the account data that conforms to the types of account data specified by the set of permissions.

20 Claims, 7 Drawing Sheets

Related U.S. Application Data continuation of application No. 16/905,339, filed on Jun. 18, 2020, now Pat. No. 11,481,838, which is a continuation of application No. 15/337,879, filed on Oct. 28, 2016, now Pat. No. 10,692,138.

(60) Provisional application No. 62/247,653, filed on Oct. 28, 2015.

(56) References Cited

U.S. PATENT DOCUMENTS

| | | | |
|---|---|---|---|
| 7,873,677 B2 | 1/2011 | Messing et al. | |
| 8,306,255 B1 | 11/2012 | Degnan | |
| 8,484,626 B2 | 7/2013 | Nagulu et al. | |
| 8,725,605 B1* | 5/2014 | Plunkett | G06Q 40/02 705/40 |
| 8,745,698 B1* | 6/2014 | Ashfield | H04L 63/08 726/4 |
| 8,838,625 B2 | 9/2014 | Xu et al. | |
| 9,602,508 B1* | 3/2017 | Mahaffey | H04L 9/3271 |
| 10,692,138 B1 | 6/2020 | Nguyen et al. | |
| 11,481,838 B1 | 10/2022 | Nguyen et al. | |
| 2013/0219473 A1* | 8/2013 | Schaefer | G06F 21/31 726/4 |
| 2014/0137232 A1* | 5/2014 | Kobayashi | H04L 63/10 726/17 |
| 2014/0310792 A1* | 10/2014 | Hyland | H04L 63/0815 726/8 |
| 2015/0058931 A1* | 2/2015 | Miu | G06Q 20/02 707/784 |
| 2015/0326550 A1* | 11/2015 | Schropfer | H04L 63/08 726/7 |
| 2017/0068954 A1 | 3/2017 | Hockey et al. | |
| 2017/0070500 A1 | 3/2017 | Hockey et al. | |

OTHER PUBLICATIONS

Prosecution History from U.S. Appl. No. 16/905,339, now issued U.S. Pat. No. 11,481,838, dated Mar. 2, 2022 through Jun. 29, 2022, 44 pp.

Prosecution History from U.S. Appl. No. 18/048,720, dated Aug. 17, 2023 through Apr. 24, 2024, 34 pp.

U.S. Appl. No. 18/048,720, filed Oct. 21, 2022, naming inventors Nguyen et al.

* cited by examiner

It doesn't look like you're currently enrolled in Secure Data Exchange. Set your preferences now to take advantage of this enhanced security.

- You never have to share your User Name and Password with other sites
- You have total control over what data is shared with other sites Be Sure to Accept our Terms & Conditions before proceeding.

CHOOSE WHAT DATA YOU"D LIKE TO SHARE:

| ACCOUNT | SHARE BALANCES | SHARE TRANSACTIONS | SHARE BOTH | DON'T SHARE |
|---|---|---|---|---|
| CHECKING - XXXX1234 | ○ | ○ | ● | ○ |
| SAVINGS - XXXX5678 | ○ | ○ | ● | ○ |
| CREDIT CARD - XXXX9101 | ○ | ○ | ● | ○ |
| MORTGAGE - XXXX1213 |   |   | ● | ○ |

SECURE DATA EXCHANGE

RELATED APPLICATIONS

This application is a continuation of U.S. patent application Ser. No. 18/048,720 entitled SECURE DATA EXCHANGE and filed Oct. 21, 2022, which is a continuation of U.S. patent application Ser. No. 16/905,339 entitled SECURE DATA EXCHANGE and filed Jun. 18, 2020, which is a continuation of U.S. patent application Ser. No. 15/337,879 entitled SECURE DATA EXCHANGE and filed Oct. 28, 2016, which claims the benefit of U.S. Provisional Application No. 62/247,653 entitled SECURE DATA EXCHANGE and filed Oct. 28, 2015, the entire contents of each of which are incorporated herein by reference.

TECHNICAL FIELD

The disclosure relates to data security and authorization techniques.

BACKGROUND

Service providers may use a variety of user authentication tools to verify an identity of a user. For example, a service provider may use the authentication tools to verify the identity of the user prior to providing information or services access to the user. The user authentication tools may be based on data that uniquely identifies the user. Example authentication tools include a password, a personal identification number, personal information about the user, or the like. In an example, a banking service may prompt a user to provide password and/or a personal identification number prior to providing account information to the user.

In some instances, a party other than the user may attempt to access information associated with a user, such as personal information or account information. For example, the user may authorize a third-party to retrieve financial account information on behalf of the user. Such third-parties may be referred to as authorized third-parties. In other examples, a third-party that has not been authorized by the user may attempt to retrieve personal or financial account information without the authorization of the user. Such third-parties may be referred to as unauthorized third-parties.

SUMMARY

This disclosure includes techniques for controlling the exchange of electronic data between a service provider and a third-party. According to aspects of this disclosure, a computing device may control the manner in which data is transferred between the service provider and the third-party. For example, a user may define a set of permissions that specifies types of data to share with the third-party. In instances in which the service provider is a financial institution, the set of permissions may specify types of financial account data, such as data of a particular account (e.g., a checking account, a savings account, a brokerage account, a mortgage account, or the like), balance data, transaction data, personal information, activity history, or the like. The computing device may provide access to the financial account data based on the set of permissions. The computing device may also, in some instances, deny third-party access to the data based on one or more blocking policies. In this way, the techniques may be used to authorize and/or deny third-party access to secure data. The techniques may provide enhanced security and may allow a user to control the type of data being accessed by third-parties. The techniques may also make data access for authorized third-parties more efficient, e.g., by providing tools for accessing secure data in an efficient manner (e.g., without data scraping).

In an example, a method includes determining, by a computing device, a set of permissions that specifies types of account data of one or more financial accounts to share with a third-party, the one or more financial accounts being associated with a user and held by a financial institution; generating, by the computing device, authorization data that authenticates the third-party and authorizes the third-party to access the types of account data specified by the set of permissions; transmitting, by the computing device, the authorization data to the third-party; receiving, by the computing device and after transmitting the authorization data, a request for authorization that includes the authorization data and a request for account data of the one or more financial accounts that conforms to the types of account data specified by the set of permissions; in response to receiving the request for authorization, authorizing, by the computing device, the third-party based on the authorization data; and in response to authorizing the third-party, transmitting, by the computing device, the account data that conforms to the types of account data specified by the set of permissions.

In another example, an apparatus includes a memory configured to store a set of permissions that specifies types of account data of one or more financial accounts to share with a third-party, the one or more financial accounts being associated with a user and held by a financial institution. The apparatus also includes one or more processors configured to generate authorization data that authenticates the third-party and authorizes the third-party to access the types of account data specified by the set of permissions, transmit the authorization data to the third-party, receive, after transmitting the authorization data, a request for authorization that includes the authorization data and a request for account data of the one or more financial accounts that conforms to the types of account data specified by the set of permissions, in response to receiving the request for authorization, authorize the third-party based on the authorization data, and in response to authorizing the third-party, transmit the account data that conforms to the types of account data specified by the set of permissions.

In another example, a non-transitory computer-readable medium has instructions stored thereon that, when executed, cause one or more processors to determine a set of permissions that specifies types of account data of one or more financial accounts of a user to share with a third-party; generate authorization data that authenticates the third-party and authorizes the third-party to access the types of account data specified by the set of permissions; transmit the authorization data to the third-party; receive, after transmitting the authorization data, a request for authorization that includes the authorization data and a request for account data of the one or more financial accounts that conforms to the types of account data specified by the set of permissions; in response to receiving the request for authorization, authorize the third-party based on the authorization data; and in response to authorizing the third-party, transmit the account data that conforms to the types of account data specified by the set of permissions.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a conceptual diagram illustrating determining a set of permissions for secure data in accordance with the techniques of this disclosure.

DETAILED DESCRIPTION

Figure 1:
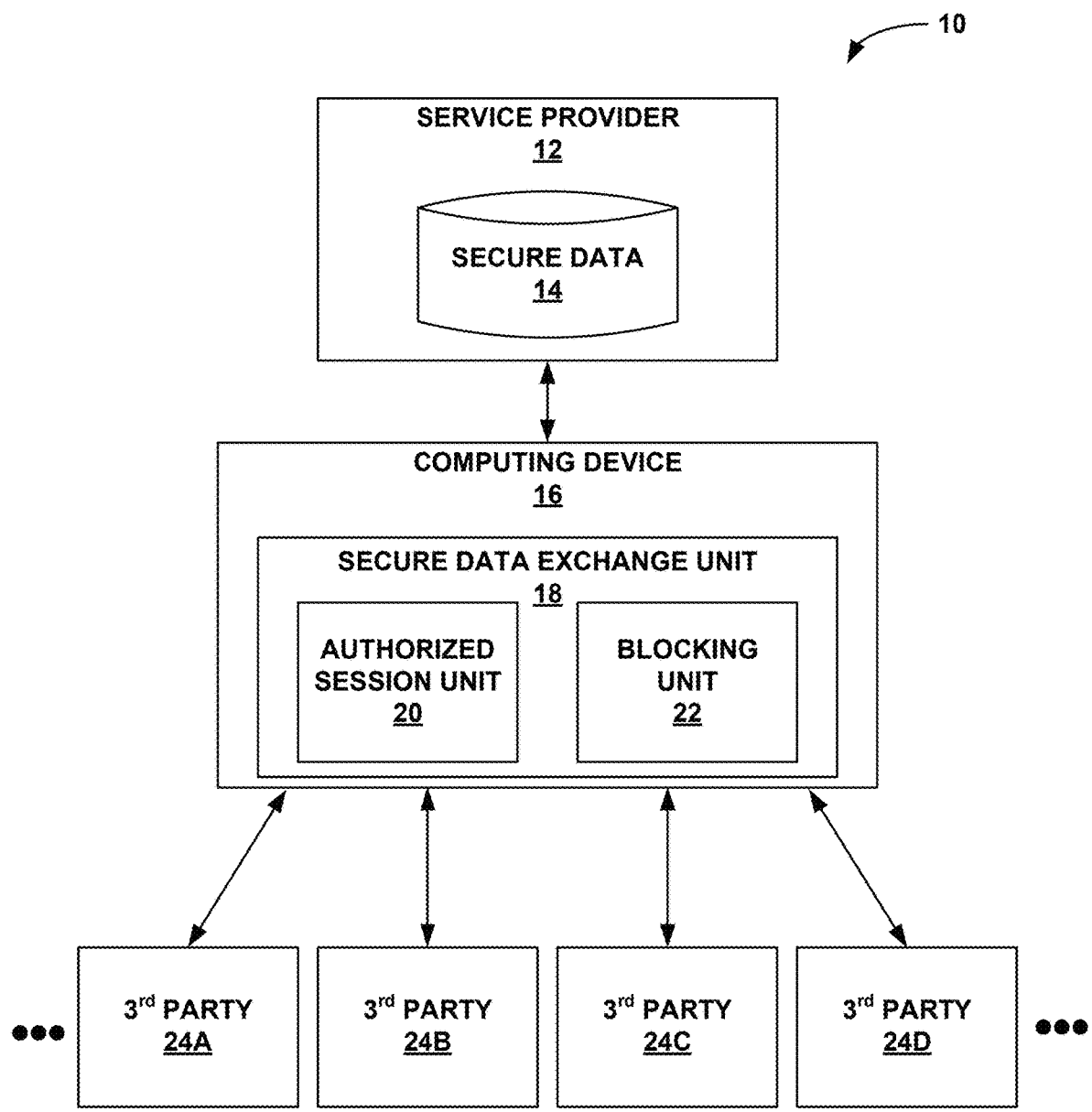
FIG. 1 is a block diagram illustrating an example computing system with a secure data exchange unit configured to manage secure data transfers in accordance with the techniques of this disclosure.

FIG. 1 is a block diagram illustrating an example networked environment 10 that includes a service provider 12 storing secure data 14 and a computing device 16 having a secure data exchange unit 18 that includes an authorized session unit 20 and a blocking unit 22. Computing device 16 may control communication between service provider 12 and a plurality of third-parties 24A, 24B, 24C, and 24D (collectively, third-parties 24).

Service provider 12 may host one or more services for access by a user of the services. In an example for purposes of illustration, service provider 12 may host services associated with a financial institution that offers different banking products, such as checking accounts, savings accounts, and credit accounts; different lending products, such as home loans, car loans, business loans, student loans, and the like; or other financial services. In this example, service provider 12 may maintain secure data 14 that includes financial data (e.g., transactions, balances, and the like) associated with one or more financial accounts of a user. As described in greater detail below, service provider 12 may receive requests of access to secure data 14 from third-parties 24.

Computing device 16 may include a variety of devices for processing and/or manipulating data. For example, in general, the functionality of computing device 16 may be implemented in a device that includes one or more processing units, such as one or more microprocessors. The functionality of computing device 16 may be implemented in hardware or in a combination of software and hardware, where requisite hardware may be provided to store and execute software instructions. Such hardware may include, for example, a processing unit and a computer-readable storage medium. Other hardware may include digital signal processors (DSPs), application specific integrated circuits (ASICs), field programmable gate arrays (FPGAs), or any other equivalent integrated or discrete logic circuitry, as well as any combinations of such components.

While shown as a single computing device in the example of FIG. 1 for purposes of illustration and discussion, in some examples, computing device 16 may include or participate in a distributed network of computing devices including one or more databases, file servers, and/or other computing devices. In addition, while shown separately from service provider 12 for purposes of illustration and discussion, in some examples, computing device 16 may be integrated with service provider 12. That is, service provider 12 may incorporate computing device 16 in a computing environment maintained by service provider 12.

In some examples, service provider 12, computing device 16, and third-parties 24 may communicate via a network (not shown). The network may include wired and/or wireless links. The links may form part of a packet-based network, such as a local area network, a wide-area network, or a global network such as the Internet. The links may include routers, switches, base stations, or any other equipment that may be useful to facilitate communication between service provider 12, computing device 16, and third-parties 24.

In some examples, one or more of third-parties 24 may attempt to access secure data 14. For example, third-parties 24 may attempt to access personal information associated with a user of service provider 12 or financial data (e.g., transactions, balances, and the like) associated with one or more financial accounts of the user maintained by service provider 12. In some instances, the user may authorize one or more of third-parties 24 to retrieve financial account information on behalf of the user (referred to herein as authorized third-parties). For example, authorized third-parties may include third-party financial service providers and data aggregators designed to retrieve financial data for purposes accounting (e.g., QuickBooks™ or Quicken™) or budgeting (e.g., Mint.com™). In other instances, third-parties 24 may be unauthorized third-parties attempting to access the financial data, e.g., for nefarious reasons.

Third-parties 24 may access secure data 14 in a variety of manners. In one example for purposes of illustration, third-party 24A may be an authorized third-party. A user, i.e., an account holder, of account data included in secure data 14 may provide third-party 24A with authentication information associated with the user, such as a user name and a password. Using this authentication information, third-party 24A may access secure data 14 on behalf of the user. In particular, third-party 24A may use one or more automated techniques to access secure data 14 on behalf of the user.

In the example above, in some instances, third-party 24A may not have the processing capabilities or computing tools (e.g., such as an Application Programming Interface (API)) to access secure data 14 in the format maintained by service provider 12. In such instances, third-party 24A may implement one or more data scraping techniques to gather secure data 24A. In one example, third-party 24A may perform screen scraping by using the authentication information provided by the user to access secure data 14 from service provider 12, e.g., via a webpage or other access point of service provider 12, and may scrape secure data 14 from the webpage or other access point using an automated technique.

Third-party access to secure data 14 may present a variety of security risks. For example, authorized third-party access may present a security risk, because the authentication information provided by the user to the authorized third-party (e.g., such as user name and a password) may be stored by the third-party, which may make the authentication information susceptible to being compromised. The transmission of the authentication information from the user to the authorized third-party may also be subject to man-in-the-middle or other cyber security attacks. In addition to the potential security risks, satisfying numerous requests for secure data 14 from third-parties 24 may present a significant data processing burden.

According to aspects of this disclosure, secure data exchange unit 18 may be responsible for controlling the exchange of secure data 14 between service provider 12 and third-parties 24. For example, as described in greater detail below, secure data exchange unit 18 may provide one or more authentication and authorization tools for controlling the manner in which data is transferred between service provider 12 and third-parties 24. Secure data exchange unit 18 may permit a user to define a set of permissions that specifies types of account data of one or more financial accounts of the user to share with third-parties 24.

In general, "types of account data" may refer to a variety of characteristics of financial accounts. For example, a type of account data may refer to a particular account of a user held by a financial institution. That is, the user may define the set of permission such that account data from only particular accounts (e.g., a checking account, a savings account, a brokerage account, a mortgage account, a credit card account, or the like) is shared with third-parties 24. As another example, a type of account data may refer to a level or granularity of account data. That is, the user may define the set of permissions such that balance level account data or transaction level account data (or no data) is shared with third-parties 24. As still another example, a type of account data may refer to other characteristics of the financial accounts, such as personal information of a holder of a financial account, activity history of a financial account, or the like.

Secure data exchange unit 18 may allow one or more third-parties 24 to access secure data 14 of the user based on the set of permissions and without the user transmitting authentication data (e.g., a user name and a password, personal information, biometrics, or other authentication techniques) to third-parties 24. Secure data exchange unit 18 may also, in some instances, deny third-parties 24 access to service provider 12 and/or secure data 14 based on one or more blocking policies.

Hence, in some examples, this disclosure provides a technical solution to the above-described issue of data security using computerized techniques to authorize or deny third-parties 24 access to secure data 14. As described in greater detail below, in some instances, the techniques may provide enhanced security and may allow a user to control the type of secure data 14 being accessed by third-parties 24. The techniques may also make data access for authorized third-parties 24 more efficient, e.g., by providing third-parties 24 with access to an API or other tools that allow third-parties 24 to access secure data 14 in an efficient manner (e.g., without data scraping).

According to aspects of this disclosure, authorized session unit 20 may be responsible for establishing authorization data that may be used by one of third-parties 24 to access secure data 14. In an example for purposes of illustration, authorized session unit 20 may receive a request by third-party 24A to access secure data 14. In response to the request, authorized session unit 20 may initiate a secure session that allows a user of third-party 24A that has secure data 14 at service provider 12 to provide authentication information to authorized session unit 20 (e.g., a user name and a password, personal information, biometrics, or other authentication techniques) previously established between the user and service provider 12. Authorization session unit 20 may initiate the secure web-based session that allows the user to interact directly with authorization session unit 20. Because the user interacts with authorization session unit 20, the user need not provide the authentication information to third-party 24A in the manner described above.

Authorized session unit 20 may authenticate the user using the secure session based on the provided authentication information. In response to authenticating the user, authorization session unit 20 may determine types of data permissions available for secure data 14 associated with the user. For example, in instances in which service provider is a financial service provider, authorized session unit 20 may determine types of financial account data and that may be accessed by third-party 24A (e.g., types of accounts such as checking accounts, savings accounts, brokerage accounts, mortgage accounts, or the like, types of financial data such as balance level data or transaction level data, types of personal information, or the like).

Authorized session unit 20 may present the determined types of data permissions for selection by the user. For example, authorized session unit 20 may generate a graphical user interface (GUI) that includes user-selectable elements that correspond the types of data. Authorization session unit 20 may receive an indication of one or more permissions selected by the user that specify the type of data that may be accessed by third-party 24A. That is, authorized session unit 20 may receive an indication of the type or types of data that is permitted to be shared with third-party 24A.

Authorized session unit 20 may, in some examples, determine the types of permissions (e.g., without input by the user). For example, authorized session unit 20 may automatically determine not to share certain types of data with third-parties 24 based on a characteristic of third-parties 24 or a characteristic of the data. That is, authorized session unit 20 may categorically block certain types of data from being shared with third-parties and/or block particular third-parties from receiving data. In this way, authorized session unit 20 may determine a set of permissions that specifies types of data of secure data 14 to share with third-party 24A. As described below with respect to FIG. 2, authorized session unit 20 may store the set of permissions to memory.

According to aspects of this disclosure, authorized session unit 20 may also generate authorization data that authenticates third-party 24A and authorizes third-party 24A to access the types of account data specified by the set of permissions. The authorization data is typically distinct from authentication data initially provided to authenticate the user (e.g., such as a user name and password). For example, the authorization data may include one or more access tokens for use by third-party 24A to access the types of account data specified by the set of permissions. In an example for purposes of illustration, authorization data may include one or more tokens that conform to an authorization standard such as OAuth or OpenID. In other examples, other techniques may be used to generate authorization data for securely authenticating that third-party 24A (e.g., Security Assertion Markup Language (SAML), Mozilla Persona, or other open or proprietary techniques).

Authorized session unit 20 may transmit the authorization data to third-party 24A. Thereafter, authorized session unit 20 may receive requests by third-party 24A to access secure data 14 that include the authorization data. Authorization session unit 20 may authorize third-party 24A using the authorization data. For example, authorized session unit 20 may authenticate third-party 24A as being trusted by the user and authorized to receive the types of data specified by the set of permissions. Authorized session unit 20 may retrieve the appropriate data and transmit the data to third-party 24A.

While the example described above is described with respect to third-party 24A for purposes of illustration, it should be apparent that any combination of the above-described techniques may be used to control data exchanges between any number of third-parties 24.

Blocking unit 22 may be configured to block one or more of third-parties 24 from interacting with service provider 12 and/or accessing secure data 14. In some examples, blocking unit 22 may apply one or more blocking policies to perform the blocking. The blocking policies may be designed to differentiate between the activity associated with users and authorized third-parties (e.g., that have been issued authorization data) and unauthorized or unwanted parties (e.g., such as automated bots and/or screen scrapers).

For example, upon receiving a request by one of third-parties 24 to interact with service provider 12 (e.g., access a website or other access point of service provider 12) or retrieve secure data 14, blocking unit 22 may analyze one or more characteristics of the third-party and/or the request. Blocking unit 22 may permit or deny the request based on whether the one or more characteristics are in conformance with the policies.

Blocking unit 22 may apply at least one of deterministic policies and heuristic policies. Blocking unit 22 may apply deterministic policies to all third-parties 24. Example deterministic policies may include an IP address policy, a user agent string policy, or an automated script policy. For example, blocking unit 22 may block third-parties 24 using a particular IP address to access a website maintained by service provider 12. Blocking unit 22 may apply heuristic policies based on the request and/or third-party. Example heuristic policies include a behavioral policy (e.g., tracking the actions of third-parties 24) or a telemetric policy (e.g., tracking a type or amount of data requested by third-parties 24).

Figure 2:
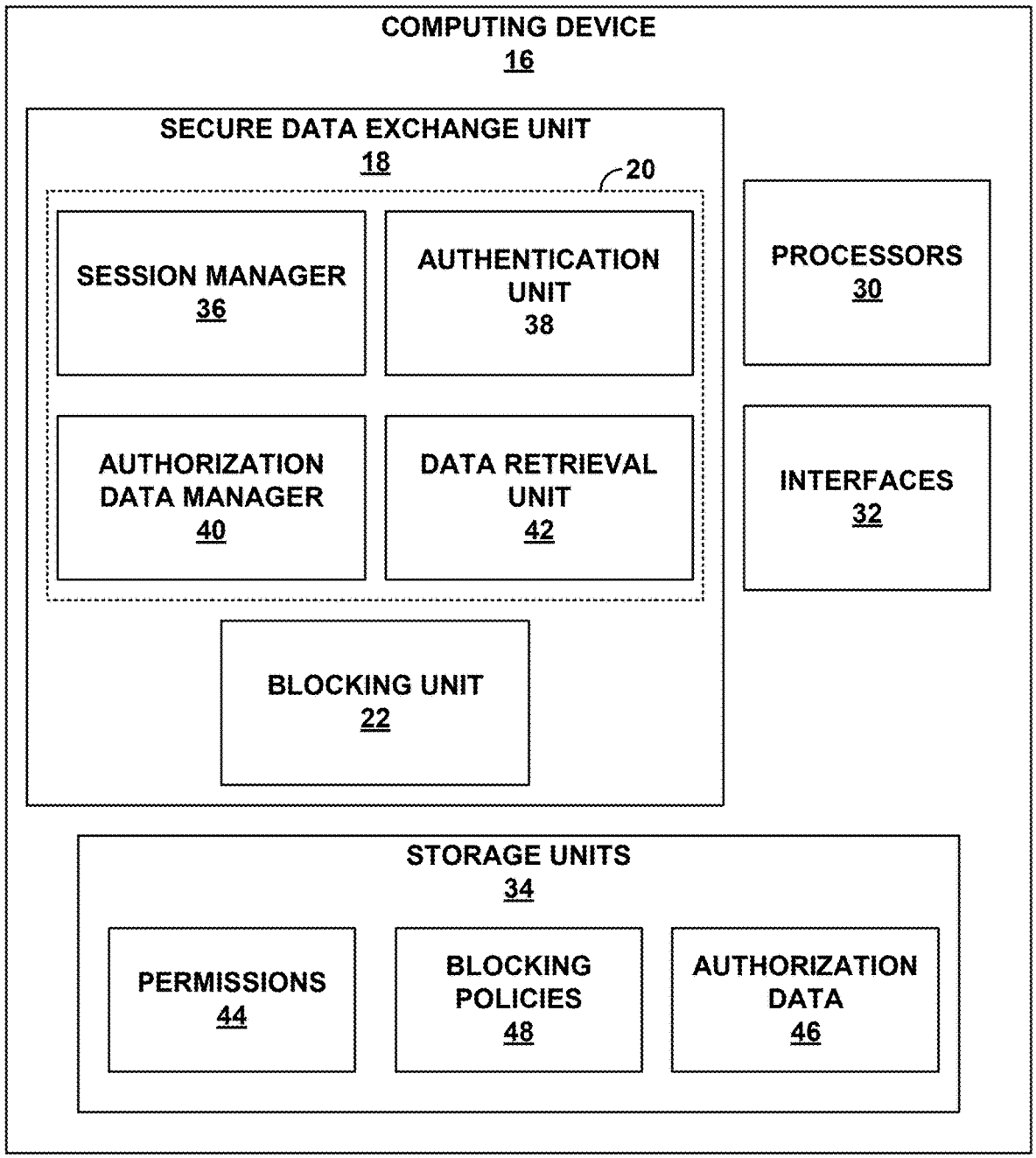
FIG. 2 is a block diagram illustrating an example computing device including the secure data exchange unit from FIG. 1 in greater detail.

FIG. 2 is a block diagram illustrating an example of computing device 16 including secure data exchange unit 18 from FIG. 1 in greater detail. In the illustrated example, computing device 16 includes authorized session unit 20, blocking unit 22, processors 30, one or more interfaces 32, and storage units 34. As illustrated in the example of FIG. 2, authorized session unit 20 of secure data exchange unit 18 includes a session manager 36, an authentication unit 38, an authorization data manager 38, and a data retrieval unit 42. In addition, storage units 34 are shown as storing permissions 44, authorization data 46, and blocking policies 48. The architecture of computing device 16 illustrated in FIG. 2 is shown for exemplary purposes only and computing device 16 should not be limited to this architecture. In other examples, computing device 16 may be configured in a variety of other ways having a variety of additional (or fewer) functional units.

Although not shown in FIG. 2, each of the components, units or modules of computing device 12 are coupled (physically, communicatively, and/or operatively) using communication channels for inter-component communications. In some examples, the communication channels may include a system bus, a network connection, an inter-process communication data structure, or any other method for communicating data.

Processors 30, in one example, are configured to implement functionality and/or process instructions for execution within computing device 16. For example, processors 30 may be capable of processing instructions stored by storage units 34. Processors 30 may include, for example, microprocessors, digital signal processors (DSPs), application specific integrated circuits (ASICs), field-programmable gate array (FPGAs), or equivalent discrete or integrated logic circuitry.

Computing device 16 may utilize interfaces 32 to communicate with external devices via one or more wired or wireless connections. In some examples, computing device 16 utilizes interfaces 32 to communicate with external devices such as devices associated with third-parties 24 (FIG. 1). Interfaces 32 may be universal serial bus (USB) interfaces, optical interfaces, or network interfaces cards, or any other type of interfaces capable of sending and receiving information. Examples of such network interfaces may include Ethernet, Wi-Fi, or Bluetooth radios.

Storage units 34 may store an operating system (not shown) that controls the operation of components of computing device 16. For example, the operating system may facilitate the communication of secure data exchange unit 18 with processors 30, interfaces 32, and storage units 34. In some examples, storage units 34 are used to store program instructions for execution by processors 30. Storage units 34 may also be configured to store information within computing device 16 during operation. Storage units 34 may be used by software or applications (e.g., such as secure data exchange unit 18) running on processors 30 of computing device 16 to temporarily store information during program execution.

Storage units 34 may include a computer-readable storage medium or computer-readable storage device. In some examples, storage units 34 include one or more of a short-term memory or a long-term memory. Storage units 34 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

According to aspects of this disclosure, secure data exchange unit 18 may be configured to control access to data, such as secure data 14 of service provider 12 (FIG. 1). Secure data exchange unit 18 and the components thereof may be executable by processors 30 or implemented as one or more hardware units of computing device 16.

Session manager 36 may be responsible for receiving requests by third-parties (e.g., such as third-parties 24 (FIG. 1)) to access secure data. In response to a request, session manager 36 may initiate a secure session that allows a user of a third-party to provide authentication information (e.g., a user name and a password, personal information, biometrics, or other authentication techniques) that authenticates the user. For example, session manager 36 may generate a user-selectable prompt to initiate the secure session. Upon selection by the user, session manager 36 may initiate a secure Hypertext Transfer Protocol (HTTP) session or other secure session that allows the user to interact with session manager 36. Authentication unit 38 may authenticate the user based on the authentication information provided at the secure session.

Authorization data manager 40 may determine types of account data associated with the user and available for selection. For example, authorization data manager 40 may determine types of accounts that are associated with the user and held by service provider 12 (e.g., checking accounts, savings accounts, or other accounts), types of financial data associated with the user (e.g., balance data, transaction data, or the like), types of user data associated with the user (e.g.

personal user information, user activity history, or the like), or other types of data for which the user may provide access to a third-party.

In some instances, authorization data manager 40 may present the determined types of account data for selection by the user via session manager 36. For example, authorization data manager 40 may generate a GUI that includes user-selectable elements that correspond the determined types of account data. According to some aspects, the determination of the types of account data may be specified by the third-party that is being granted access to the data. For example, a particular third-party may desire to have access to particular types of account data for a user. In this example, the third-party may provide an indication of the types of account data to service provider 12, and authorization data manager 40 may populate the GUI with the types of account data specified by the third-party.

Authorization data manager 40 may receive an indication of one or more types of data selected by the user that may be accessed by a particular third-party. That is, authorization data manager 40 may receive an indication, e.g., via the user selectable elements of the GUI, of the type or types of data that is permitted to be shared with the third-party. In some instances, authorization data manager 40 may determine the types of permissions (e.g., without input by the user). Authorization data manager 40 may store the determined permissions 44 to storage units 34.

According to aspects of this disclosure, authorization data manager 40 may also generate authorization data 46 that authenticates the third-party and authorizes the third-party to access the types of account data specified by permissions 44. For example, authorization data 46 may include one or more access tokens for use by the third-party to access the types of account data specified by permissions 44. That is, authorization data manager 40 may generate authorization data 46 that may be used to authenticate the third-party, as well as determine permissions 44 applicable to the third-party. In some instances, authorization data 46 may include one or more tokens that conform to an authorization standard such as OAuth or OpenID. In other examples, authorization data 46 may conform to other authorization standards or techniques (e.g., Security Assertion Markup Language (SAML), Mozilla Persona, or other open or proprietary techniques). Authorization data manager 40 may transmit authorization data 46 to the third-party via interfaces 32.

After establishing authorization data 46, secure data exchange unit 18 may receive a request for data from a third-party that includes authorization data 46. Again, authorization data 46 does not include the authentication data initially used by authentication unit 38 to authenticate the user (e.g., a user name and a password, personal information, biometrics, or other authentication techniques). Authentication unit 38 may use the received authorization data 46 to authorize the third-party. For example, authentication unit 38 may verify that the permissions included in the received authorization data 46 matches permissions 44 stored to storage units 34 for the third-party. In instances in which permissions 44 do not match (e.g., permission 44 were changed after authorization data 46 was issued), authentication unit 38 may deny access or take other corrective action. Authentication unit 38 may also authorize the third-party to receive the types of data specified by the set of permissions.

Data retrieval unit 42 may retrieve the appropriate data (e.g., data having the types specified by permissions 44) from storage units that store the data (e.g., storage units associated with service provider 12 shown in FIG. 1). Data retrieval unit 42 may also transmit the data to the third-party using interfaces 32.

In some examples, secure data exchange unit 18 may have an associated set of Application Programming Interfaces (APIs) that allow the third-party to interact with secure data exchange unit 18. For example, the APIs may specify the manner in which the third-party requests and uses authorization data to retrieve user data from a service provider. According to aspects of this disclosure, the APIs may be configured to receive requests for data (after authentication of a third-party, such as validating an access token issued to the third-party) and provide a data response.

In this manner, this disclosure includes techniques for a standardized exchange of data using secure APIs. The tokenized credentials and customer selected data share elements may provide enhanced security. For example, the above-described authorization data may obviate the need for the user to provide authentication data to third-parties and the granular nature of the permissions prevents more data than necessary from being shared with third-parties.

As noted above with respect to FIG. 1, blocking unit 22 may be configured to block one or more third-parties from interacting with service provider 12 and/or accessing secure data 14 (FIG. 1). Blocking unit 22 may apply one or more blocking policies to perform the blocking. The blocking policies may include deterministic policies and/or heuristic policies. For example, as noted above with respect to FIG. 1, example deterministic policies may include an IP address policy, a user agent string policy, or an automated script policy. For example, blocking unit 22 may block third-parties 24 using a particular IP address to access a website maintained by service provider 12. Blocking unit 22 may apply heuristic policies based on the request and/or third-party. Example heuristic policies include a behavioral policy (e.g., tracking the actions of third-parties 24) or a telemetric policy (e.g., tracking a type or amount of data requested by third-parties 24).

Figure 3:
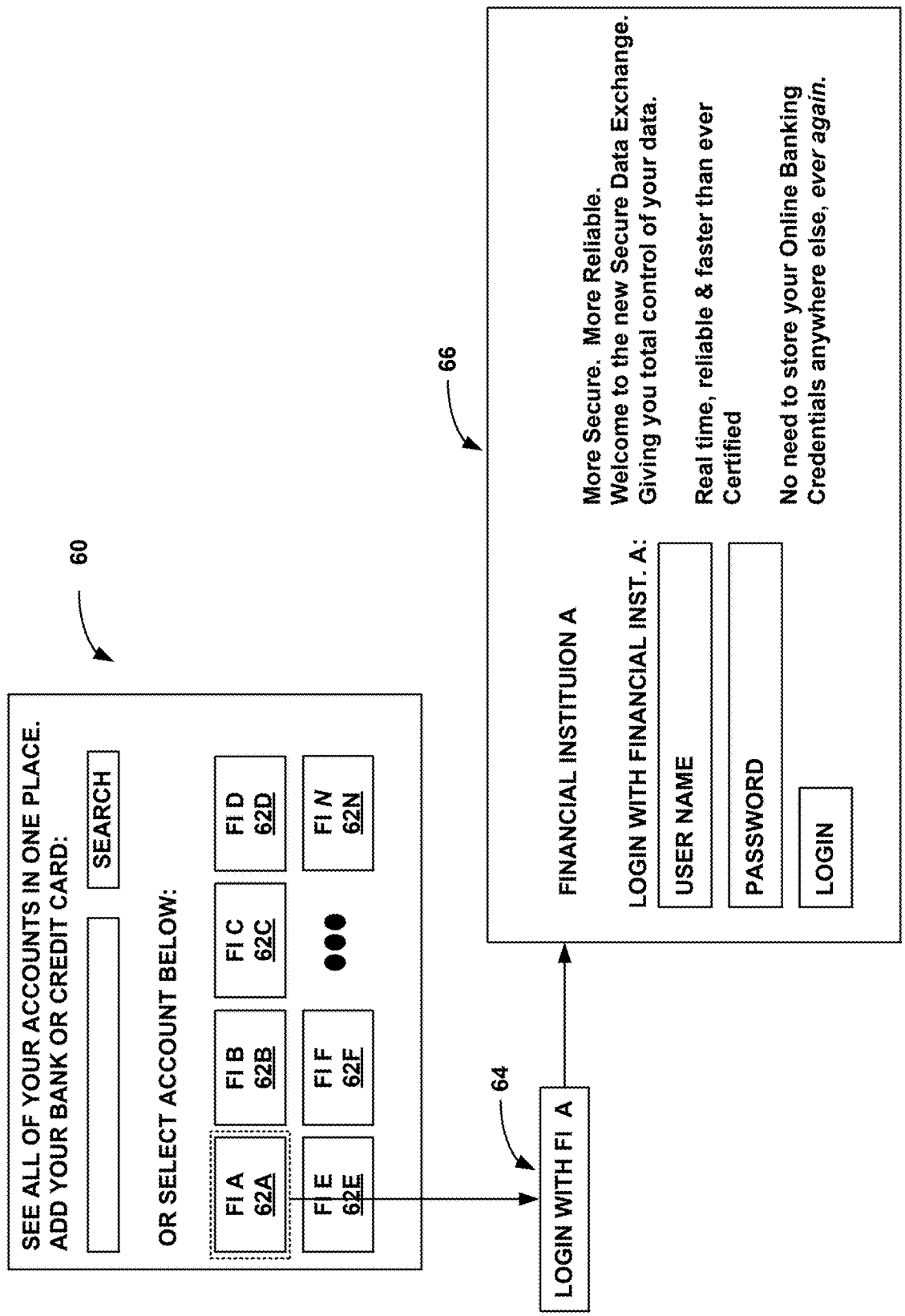
FIG. 3 is a conceptual diagram illustrating an authentication session in accordance with the techniques of this disclosure.

FIG. 3 is a conceptual diagram illustrating an authentication session in accordance with the techniques of this disclosure. The authentication session shown in FIG. 3 may be managed, for example, by session manager 36 shown in FIG. 2. In the example of FIG. 3, a third-party (such as one of third-parties 24) is configured to aggregate data from one or more financial accounts of the user. The third-party prompts a user having one or more financial accounts with one or more service provider to select a service provider for data aggregation. User interface 60 illustrates an example UI that may be generated by the third-party, and includes a plurality of financial institutions (FIs) 62A-62N.

In the example shown in FIG. 3, the user selects financial institution (FI) 62A. After selecting FI 62A, conventionally, the third-party may prompt the user to input authentication data (such as a username and password) for FI 62A. According to aspects of this disclosure, the third-party generates a prompt 64 that the user may select to direct the user to a secure session, such as a secure HTTP session or other secure session that allows the user to transmit data securely (e.g., using data encryption of other techniques).

Selection of prompt 64 directs the user to a secure session that includes GUI 66 generated by FI 62A. GUI 66 allows the user to input authentication data such a username and password that authenticates the user as being associated with one or more financial accounts maintained by FI 62A. In this example, the authentication data input by the user into GUI 66 is not transmitted to the third-party that is responsible for generating GUI 60.

FIG. 4 is a conceptual diagram illustrating determining a set of permissions for enabling secure data exchange in accordance with the techniques of this disclosure. For example, after entering the authentication data described above with respect to FIG. 3, FI 62A may prompt the user to select the type of account data that is to be shared with the third-party. That is, FI 62A may generate a GUI 70 having user-selectable UI elements 72 that indicate the types of account data. According to aspects of this disclosure, FI 62A may determine permissions data based on selection of UI elements 72. That is, selection of UI elements 72 indicates the types of financial account data that FI 62A may share with the third-party.

In the example of FIG. 4, the types of account data include types of accounts that are associated with the user (e.g., checking account XXXX1234, savings account XXXX5678, a credit card account XXXX9101, and a mortgage account XXX1213). For example, the user may select "don't share" to block financial data for a particular account from being shared with the third-party. The types of account data also include balance data or transactional data. For example, the user may select "share balances" to only share balance level data (e.g., without individual transactions contributing to the balances) with the third party. The user may select "share transactions" to only share transaction level data (e.g., without the overall balance of the account) with the third party. The user may select "share both" to share both balance level data and transaction level data with the third party. In the example shown in FIG. 4, the user indicates, via selection of UI elements 72, that FI 62A may share both balance level data and transaction level data for each of the accounts associated with the user.

It should be understood that the example of FIG. 4 is provided as merely one example. In other examples, UI elements 72 may include a more limited set of types of account data to share with third parties. For example, UI elements 72 may simply include a "connect account" option for each account of the user that allows the user to share all data associated with the respective account with the third party. In other examples, FI 62A may allow the user to determine permissions for more or fewer accounts that those shown in the example of FIG. 4. In addition, while FIG. 4 shows the same types of data for each of the accounts (e.g., balances and transactions), in other examples, each account may include a different type of data to share. Further, in other examples, FI 62A may include other types of data for selection by a user (e.g., personal user information, user activity history, or the like).

FI 62A may store the selected types of account data as permissions for use by third-party to retrieve the corresponding data. For example, FI 62A use the stored permissions to authenticate the third-party and to determine the data that the third-party is authorized to receive, as described herein.

Figure 5:
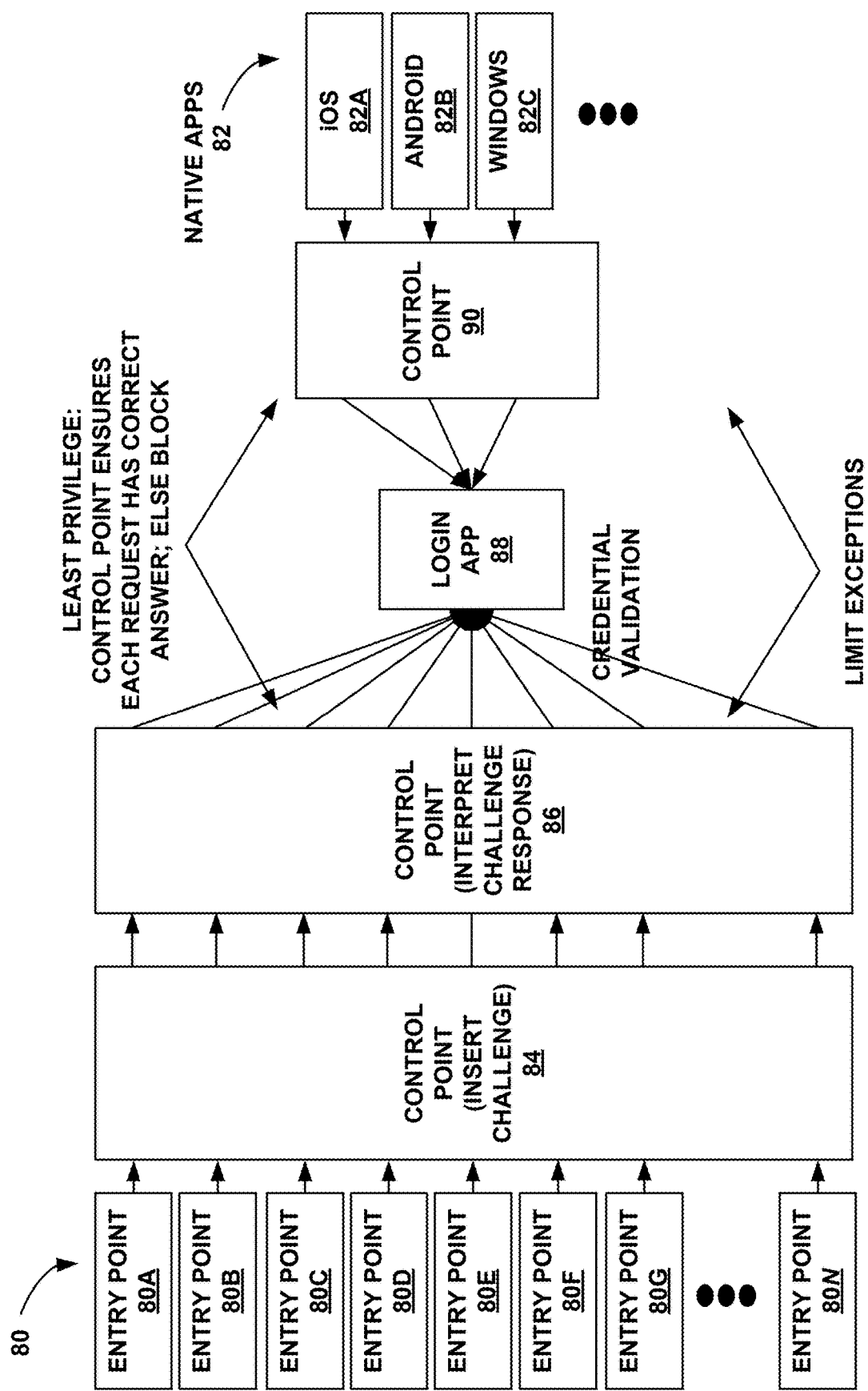
FIG. 5 is a conceptual diagram illustrating blocking techniques in accordance with the techniques of this disclosure.

FIG. 5 is a conceptual diagram illustrating blocking techniques in accordance with the techniques of this disclosure. The blocking techniques described herein may be performed at the perimeter (e.g., blocking Internet traffic of unknown origin) or at an access point where customers provide authentication data (e.g., blocking request for access at an access point). In some examples, the blocking techniques shown in FIG. 6 may be applied by blocking unit 22 (FIGS. 1 and 2). However, while described with respect to blocking unit 22 of computing device 16 for purposes of illustration, it should be understood that the techniques may be performed by a variety of other computing devices.

FIG. 5 includes a plurality of browser entry points 80A-80N that may be used by a user or third-party to request financial account data and a plurality of native applications 82A-82C that may be used by a user or third-party to request financial account data. For browser entry points 80, blocking unit 22 may be configured to perform a challenge at control point 84 to verify that the requests are associated with a user or an authorized third-party that has been issued authorization data. The challenge may include identifying an IP address of the request, reading a signature associated with the request, analyzing GET or POST requests from the requester, analyzing the manner in which the browser entry points 120 or native applications 122 were executed, analyzing interactions with a graphical user interface (GUI) presented at browser entry points 120 or native applications 122, or the like.

Control point 86 may then interpret a response to the challenge. That is, control point 86 may determine whether the response to the challenge satisfies the challenge. Blocking unit 22 may apply blocking policies based on the received response. For example, if a response does not satisfy one or more of the blocking policies maintained by blocking unit 22 (e.g., a challenge is failed), blocking unit 22 may identify the request as being unauthorized and block the request. In another example, blocking unit 22 may permit the request (e.g., provide access to data or services via login app 88), but may perform additional monitoring for that request. In some instances, control point 90 may issue and interpret similar challenges as control point 86.

Figure 6:
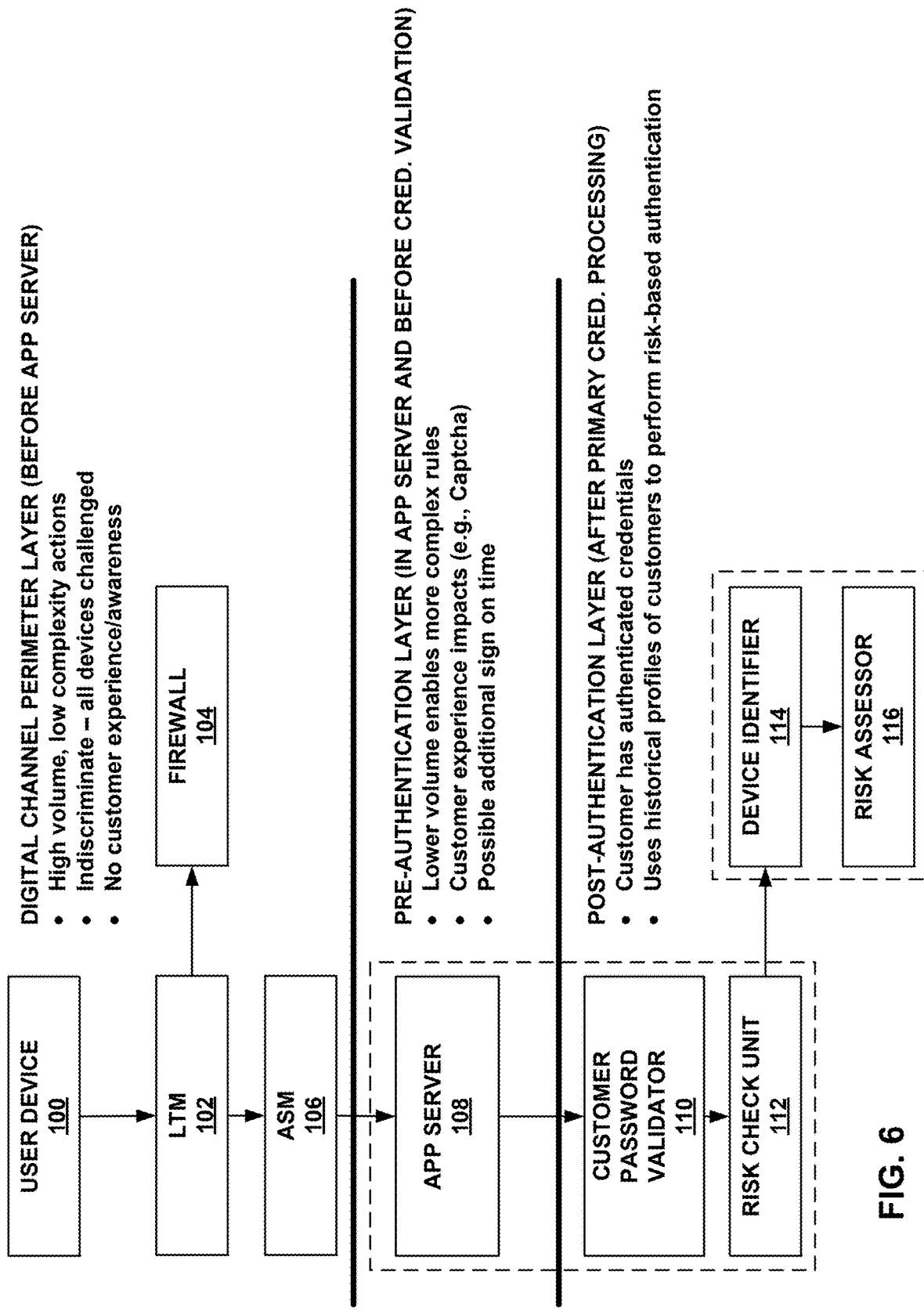
FIG. 6 is a conceptual diagram illustrating a layered security hierarchy in accordance with the techniques of this disclosure.

FIG. 6 is a conceptual diagram illustrating a layered security hierarchy in accordance with the techniques of this disclosure. The layered security hierarchy shown in FIG. 6 may be applied by blocking unit 22 and/or another component responsible for performing a secure data exchange. For example, digital channel perimeter layer security measures may be applied by a computing device prior to an application server that hosts a service provider application receiving a request for financial account data. In the example of FIG. 6, a request from user device 100 is received by local traffic manager 102, which may assemble streams of data, make traffic management decisions, and select a destination based on server performance, security, and/or availability. In some instances, local traffic manager (LTM) 102 may identify requests from unauthorized third-parties and transmit the requests to firewall 104 for blocking. The requests may also be transmitted to application security manager (ASM) 106 for additional analysis and identification of unauthorized third-parties.

Pre-authentication layer security measures may be applied by an application server security 108 before credential validation. For example, pre-authentication layer security measures may include Captcha or check-box data entries to authenticate that the request for data is originated by an authorized user, rather than an automated bot or another unauthorized user. In some instances, application server security 108 may be included in a login application that is accessed at a bowser entry point or native application (such as browser entry points 80 or native applications 82 shown in FIG. 5).

Post-authentication layer security measures may be applied after authenticating a user. Post-authentication layer security measures may be applied by customer password validator 110 and risk check unit 112, which may be included in the login application. In some instances, a security information management systems (SIMS) may apply a device identifier 114 to identify a device that originated the request for the data and a risk assessor 116 to determine a risk level associated with the request. In this way, the example of FIG. 6 illustrates a hierarchical approach to determining whether a request for financial account data is authorized. For example, the perimeter layer may be applied to all data requests, while low layers such as pre-authentication layer and post-authentication layer may provide a "safety-net" for challenging and detecting unauthorized third-parties such as bots that are able to bypass the upper layer controls.

Figure 7:
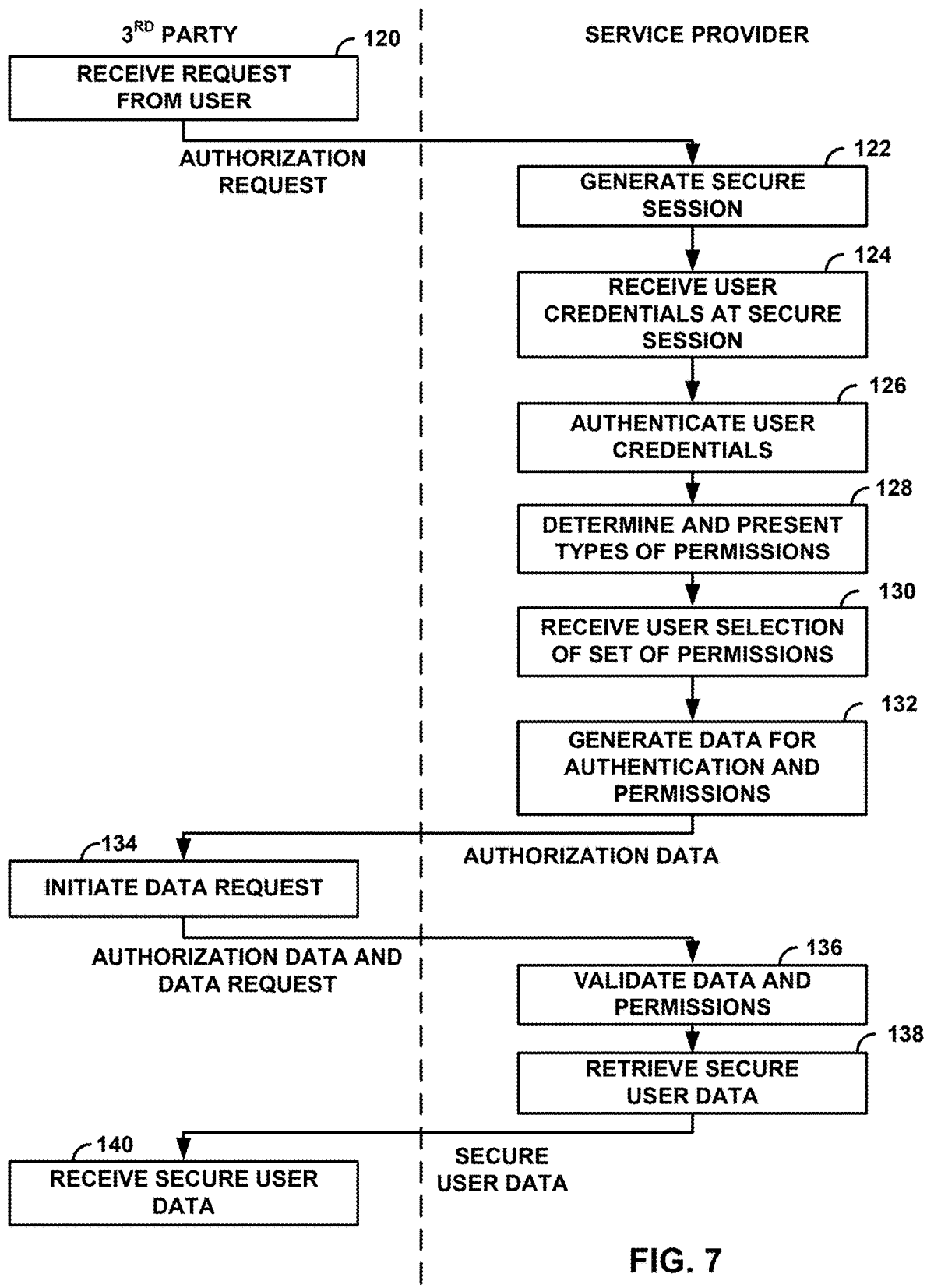
FIG. 7 is a flowchart illustrating an example process of exchanging secure data between a service provider and a third-party in accordance with the techniques of this disclosure.

FIG. 7 is a flowchart illustrating an example process of exchanging secure data between a service provider and a third-party in accordance with the techniques of this disclosure. In the example of FIG. 7, a third-party receives a request from a user to access data of one or more financial accounts associated with the user at a service provider, such as a financial institution (120). The third-party issues an authorization request to retrieve data from the service provider (authorization request).

Upon receiving the authorization request, the service provider generates a secure session, e.g., as described above with respect to FIG. 3 (122). In addition, the service provider receives previously established credentials (e.g., a user name and password, or the like) to authenticate the identity of the user (124). The service provider then authenticates the user with the provided credentials (126).

The service provider determines and presents types of permission associated with accounts of the user held by the service provider, e.g., as described above with resect to FIG. 4 (128). The service provider receives a selection of a set of permissions that specify the types of data to be shared with the third-party (130). The types of data may be granular (e.g., for particular accounts, balances, transactions, or the like) and may be separated according to account.

The service provider then generates authorization data to be used by the third-party for authentication and authorization, e.g., to determine the permissions associated with the third-party (132). The service provider may transmit the authorization data to the third-party.

After receiving the authorization data, the third-party may initiate a data request for user data from the service provider (134). The service provider may validate the authorization data and the permissions associated with the third-party (136). That is, the service provider may authenticate the request as originating from the third-party and verify that the type of data being requested is consistent with the type of data included in the permissions associated with the third-party. In some instances, as noted above, the service provider (or user) may change the permissions, which may render the generated authorization data obsolete (e.g., the third-party may not use the generated authorization data to access account information of the user).

If the authorization data is valid, the service provider retrieves the secure data requested by the third-party (138). The service provider transmits the secure data to the third-party. The third-party then receives the requested secure user data (140).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    initiating, by a computing device, a secure session with a user that allows the user to provide permissions data;
    receiving, by the computing device and from the user, the permissions data that indicates a set of permissions that specifies types of account data of one or more financial accounts to share with a third-party, the one or more financial accounts being associated with the user and held by a financial institution;
    transmitting, by the computing device and in response to receiving the permissions data, authorization data to the third-party;
    receiving, by the computing device and from the third-party, authentication data, wherein the authentication data authorizes the third-party;
    transmitting, by the computing device and in response to receiving the authentication data, one or more access tokens to the third-party, wherein the one or more access tokens indicate authorization of the third-party to access the types of account data specified by the set of permissions;
    receiving, by the computing device and from the third-party, the one or more access tokens and a request for account data of the one or more financial accounts that conforms to the types of account data specified by the set of permissions; and
    transmitting, by the computing device and to the third-party, the account data that conforms to the types of account data specified by the set of permissions in response to authorizing the third-party.

2. The method of claim 1, further comprising:
    receiving, by the computing device and from the user, authentication information; and
    authenticating, by the computing device and prior to transmitting the authorization data to the third party, the user based on the authentication information.

3. The method of claim 1, further comprising generating, by the computing device and prior to receiving the permissions data, a graphical user interface (GUI) that includes user-selectable elements that correspond to the permissions data.

4. The method of claim 3, wherein the user-selectable elements include at least one of types of accounts that are associated with the user and held by the financial institution, types of financial data associated with the user, or types of user data associated with the user.

5. The method of claim 1, further comprising receiving, by the computing device and from the third-party, a request for authorization prior to initiating the secure session, wherein the secure session with the user is initiated in response to receiving the request for authorization.

6. The method of claim 5, wherein the request for authorization is received through at least one of a browser entry point or a native application used by the third-party.

7. The method of claim 5, wherein the request for authorization includes a signature of the third-party.

8. The method of claim 5, wherein the request for authorization and the request for account data each include an identifier of the third-party.

9. The method of claim 1, wherein the authentication data comprises an authorization code.

10. The method of claim 9, wherein the authorization code is time-limited.

11. The method of claim 1, wherein the method further comprising authenticating, by the computing device and in response to receiving the one or more access tokens, the third-party based on the one or more access tokens.

12. The method of claim 1, further comprising generating, by the computing device, a set of Application Programming Interfaces (APIs) that are configured to transmit the account data in response to receiving the request for the account data.

13. The method of claim 1, further comprising initiating, by the computing device and prior to receiving the one or more access tokens, a secure session with the third-party that allows the third-party to receive the one or more access tokens.

14. The method of claim 1, further comprising initiating, by the computing device and prior to receiving the account data, a secure session with the third-party that allows the third-party to receive the account data.

15. The method of claim 1, further comprising tracking, by the computing device, a type or amount of the account data requested by the third-party.

16. The method of claim 1, further comprising:
    generating, by the computing device, the one or more access tokens for the third-party; and
    associating, by the computing device, the one or more access tokens with the set of permissions.

17. An apparatus comprising:
    a memory configured to store a set of permissions that specifies types of account data of one or more financial accounts to share with a third-party, the one or more financial accounts being associated with a user and held by a financial institution; and
    one or more processors configured to:
        initiate a secure session that allows the user to provide permissions data that indicates the set of permissions;
        receive, from the user, the permissions data;
        transmit, in response to receiving the permissions data, authorization data to the third-party;
        receive, from the third-party, authentication data, wherein the authentication data authorizes the third-party;
        transmit, in response to receiving the authentication data, one or more access tokens to the third-party, wherein the one or more access tokens indicate authorization of the third-party to access the types of account data specified by the set of permissions;
        receive, from the third-party, the one or more access tokens and a request for account data of the one or more financial accounts that conforms to the types of account data specified by the set of permissions; and
        transmit, to the third-party, the account data that conforms to the types of account data specified by the set of permissions in response to authorizing the third-party.

18. The apparatus of claim 17, wherein the one or more processors are configured to receive, from the third-party, a request for authorization prior to initiating the secure session, wherein the secure session with the user is initiated in response to receiving the request for authorization.

19. A non-transitory computer-readable medium having instructions stored thereon that, when executed, cause one or more processors to:
    initiate a secure session that allows a user to provide permissions data;
    receive, from the user, the permissions data that indicates a set of permissions that specifies types of account data of one or more financial accounts to share with a third-party, the one or more financial accounts being associated with the user and held by a financial institution;

transmit, in response to receiving the permissions data, authorization data to the third-party;

receive, from the third-party, authentication data, wherein the authentication data authorizes the third-party;

transmit, in response to receiving the authentication data, one or more access tokens to the third-party, wherein the one or more access tokens indicate authorization of the third-party to access the types of account data specified by the set of permissions;

receive, from the third-party, the one or more access tokens and a request for account data of the one or more financial accounts that conforms to the types of account data specified by the set of permissions; and transmit, to the third-party, the account data that conforms to the types of account data specified by the set of permissions in response to authorizing the third-party.

20. The non-transitory computer-readable medium of claim 19, wherein the instructions, when executed, cause the one or more processors to receive, from the third-party, a request for authorization prior to initiating the secure session, wherein the secure session with the user is initiated in response to receiving the request for authorization.

* * * * *